(12) United States Patent
Fiorentini et al.

(10) Patent No.: US 7,553,066 B2
(45) Date of Patent: Jun. 30, 2009

(54) HIGH-PRESSURE MIXING METHOD AND APPARATUS, WITH A SELF-LUBRICATING AND SCRAPING DEVICE

(75) Inventors: Carlo Fiorentini, Saronno (IT);
Maurizio Corti, Como (IT)

(73) Assignee: Afros S.p.A., Caronno Pertusella (VA) (IT)

( * ) Notice: Subject to any disclaimer, the term of this patent is extended or adjusted under 35 U.S.C. 154(b) by 0 days.

(21) Appl. No.: 11/946,955

(22) Filed: Nov. 29, 2007

(65) Prior Publication Data
US 2008/0128209 A1  Jun. 5, 2008

(30) Foreign Application Priority Data
Nov. 30, 2006 (IT) .......................... MI2006A2315

(51) Int. Cl.
*B01F 5/04* (2006.01)
*B29B 7/76* (2006.01)

(52) U.S. Cl. ..................... 366/162.5; 422/133
(58) Field of Classification Search .......... 366/138, 366/159.1, 162.4, 162.5, 167.1, 173.1; 422/131, 422/133–135; 184/24
See application file for complete search history.

(56) References Cited

U.S. PATENT DOCUMENTS

| | | | |
|---|---|---|---|
| 3,687,370 A | 8/1972 | Sperry | |
| 3,786,990 A | 1/1974 | Hagfors | |
| 3,912,234 A * | 10/1975 | Peter | ........................ 366/262 |
| 3,945,569 A | 3/1976 | Sperry | |
| 4,115,066 A | 9/1978 | Mühle | |
| 4,279,517 A * | 7/1981 | Wallner et al. | ........... 366/159.1 |
| 4,332,335 A | 6/1982 | Fiorentini | |
| 4,469,251 A | 9/1984 | Sperry et al. | |
| 5,027,975 A | 7/1991 | Keske et al. | |
| 5,339,724 A * | 8/1994 | Rosgren et al. | ................ 184/24 |
| 5,785,422 A * | 7/1998 | Eidenmuller | .............. 366/162.5 |
| 7,093,972 B2 * | 8/2006 | Breuker et al. | ........... 366/162.5 |
| 2008/0128209 A1* | 6/2008 | Fiorentini et al. | ........... 366/138 |

FOREIGN PATENT DOCUMENTS

| | | |
|---|---|---|
| DE | 2 007 935 | 9/1971 |
| DE | 89 15 329.4 | 5/1990 |
| DE | 42 14 404 | 11/1993 |
| EP | 25094 A1 * | 3/1981 |
| JP | 55-32645 | 3/1980 |

OTHER PUBLICATIONS

European Search Report, dated Mar. 17, 2009 and issued in corresponding European Patent Application No. 07 02 1087.

* cited by examiner

*Primary Examiner*—Charles E Cooley
(74) *Attorney, Agent, or Firm*—Young & Thompson

(57) ABSTRACT

The high-pressure mixing apparatus, for reactive chemical components, comprises a device for self-lubricating and scraping the outlet duct of the chemical mixture, and flushing out the scraped residues. The self-lubricating and scraping device comprises a delivery chamber for the lubricant material axially aligned and in fluid communication with the outlet duct; the lubricant delivery chamber is connected to a storage tank by a feeding and re-circulation circuit. The lubricant is sucked into the outlet duct and subsequently returned into the delivery chamber by a cleaning member in the form of a pumping piston sliding into the outlet duct, the pumping piston being provided with scraping rings for removing the reacted mixture adhered to the inner surface of the outlet duct.

15 Claims, 4 Drawing Sheets

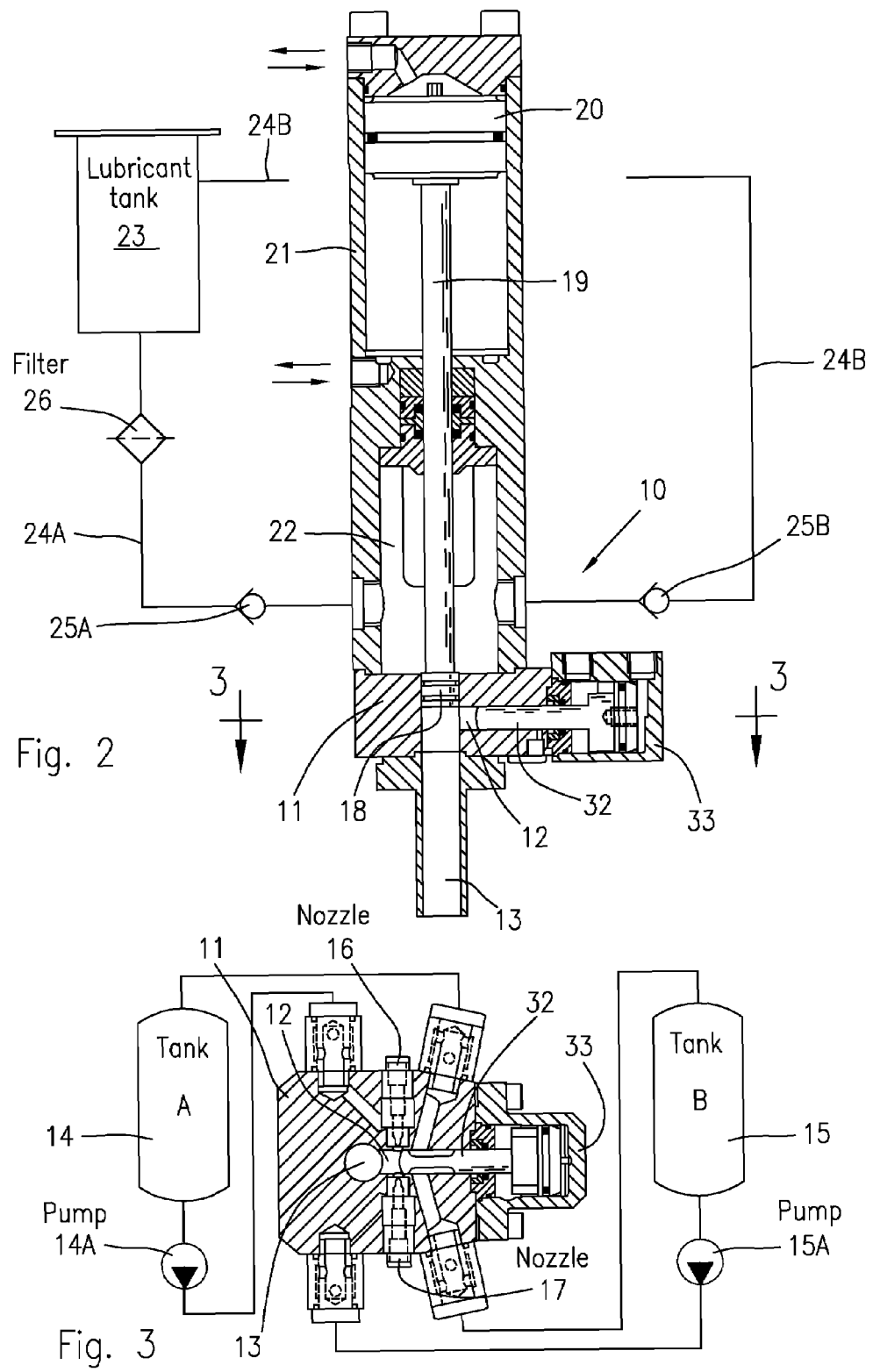

HIGH-PRESSURE MIXING METHOD AND APPARATUS, WITH A SELF-LUBRICATING AND SCRAPING DEVICE

BACKGROUND OF THE INVENTION

This invention relates to improvements to the high-pressure mixing apparatuses for mixing reactive chemical components. In particular, the invention relates to a high-pressure mixing method for mixing reactive fluid polymeric components, such as a polyol and an isocyanate to form polyurethane mixtures, in which the action of a plunger or cleaning member is exploited to carry out a self-lubrication and recirculation of a lubricating fluid, to reduce the frictional forces, preventing the polymerisation and adhesion of the reacted mixture to the inner surface of an outlet duct.

The invention also relates to a mixing apparatus or high pressure mixing head, of the aforementioned type, comprising a reciprocable cleaning member or plunger for cleaning the outlet duct by ejecting the resulting mixture, in which the plunger is conformed for scraping and causing a recirculation of a lubricant for the outlet duct.

STATE OF THE ART

A mixing apparatus for reactive chemical components, of the high-pressure type, usually comprises a body having a mixing chamber into which injectors or feeding ducts for reactive chemical components open out, and in which the chemical components are thoroughly mixed by impingement.

The mixing chamber communicates with an outlet duct for delivery of the resulting mixture, in which a cleaning member operatively connected to a hydraulic control cylinder, reciprocates to eject the residual chemical mixture.

High-pressure mixing apparatuses or mixing heads of the aforementioned type, are described for example in U.S. Pat. No. 4,115,066, DE 20.07.935 and U.S. Pat. No. 4,332,335.

In mixing apparatuses of the abovementioned type, at the end of each mixing step a cleaning member is operated to outwardly discharge the residual mixture which remains in the outlet duct. The cleaning member slides with a slight clearance inside the duct, allowing a thin layer of reacted mixture to polymerize and adhere to the internal surface of the outlet duct.

The mixture, on reacting and curing, causes the cleaning member to strongly stick to the surface of the outlet duct, generating intense frictional forces which prevent the cleaning member from sliding. The intense frictional force caused by the reacted mixture, in addition to damaging the cleaning member, also requires the use of high-powered and large-sized hydraulic cylinders, with the consequent and well-known drawbacks and need for periodical maintenance operations for replacing the worn out parts.

In an attempt to obviate the aforementioned drawbacks, in the past various expedients have been proposed including the use of lubricating or plasticizing fluids, capable of reducing the frictional forces, pre-venting or delaying the polymerization of the mixture that remains on the opposite surfaces of the outlet duct and the plunger of the cleaning device.

High-pressure mixing apparatuses provided with lubricating means for the cleaning member are described for example in U.S. Pat. Nos. 3,687,370 and U.S. Pat. No. 4,469,251, which constitute the closest prior art. These documents illustrate high-pressure mixing apparatuses, in which the chemical components are fed into a mixing chamber which extends into a outlet duct, in which a cleaning member in the form of a plunger connected to the piston of a control cylinder is made to reciprocate; the cleaning member is reciprocable between a forward or closed position, in which cut off the flows of the chemical components and ejects the residual mixture remaining in the outlet duct at the end of each mixing step, and a backward or open position for the injection nozzles.

The apparatus is also provided with a chamber containing a fluid lubricant, axially aligned to a outlet duct, in which a cleaning member partially penetrates, and is wetted with a fine film of lubricant.

U.S. Pat. No. 3,786,990 in turn suggests the use of a storing tank for containing a lubricant, which is fed by simple gravity, or by pressurised air, to wet the cleaning member in a single point behind the nozzles for injecting the chemical components into the mixing chamber.

In both cases, the cleaning member is simply wetted with a film of lubricating fluid which is entrained by the forward movement of the cleaning plunger, to wet the reacted mixture adhered to the inner surface of the outlet duct.

While on the one hand, the use of a lubricating fluid according to the previously known solutions, tends to prevent the cleaning member from sticking to the outlet duct, and consequently reduce the frictional forces, on the other it does not ensure an even wetting and adequate entrainment of the lubricating fluid into contact with the entire surface of the outlet duct; the efficacy of lubrication in this way proves to be somewhat limited and ineffective.

Moreover, the repeated reciprocating movement of the cleaning member tends to entrain the particles of reacted material that become detached from the outlet duct, causing them to roll in the annular gap or slight clearance existing between facing surfaces of the cleaning member and the outlet duct, until they fill the lubricant chamber and cavities, thereby rendering the lubricating process ineffective.

However, there is a need to find out new and different solutions whereby it is possible to implement both the lubricating efficacy, and a scraping action, substantially improving the cleaning of the outlet duct.

OBJECTS OF THE INVENTION

The main object of the invention is to provide a method and a high-pressure mixing apparatus of the self-cleaning type, which makes use of the reciprocating movement of a cleaning member for cleaning the outlet duct for delivering of the reactive mixture and to carry out an efficient and homogeneous lubricating and scraping action; therefore it is to prevent or reduce the formation of deposits of reacted material on the inner surface of the outlet duct and the sticking of the cleaning member in the closed position of the same outlet duct.

A further object of this invention is to provide a mixing apparatus or device of the high-pressure type, provided with a self-lubricating device which exploits the reciprocating movement of the cleaning member for cleaning the outlet duct, to simultaneously carry out a scraping action of the reacted material as referred to above, and a pumping action for recirculating a lubricant capable of completely and evenly wetting the outlet duct, reducing any contact between opposite surfaces and at the same time achieving a highly efficient flushing action of the scraped particles of reacted material.

A still further object is to provide a method and a mixing apparatus of the aforementioned type, comprising a system for automatically feeding and recirculating a lubricant, of such kind that the cleaning member and the outlet duct are constantly flushed with lubricant substantially devoid of pollutants.

A still further object is to avoid or prevent the accumulation of scraped particles of reacted plastic material into the mixing apparatus, by flushing and entraining the scraped particles of reacted material which become detached from the inner surface of the outlet duct during the reciprocating movement of the cleaning member along the same duct.

A further object is to provide a high-pressure mixing apparatus or device, as mentioned above, provided with suitable scraping means, whereby it is possible to carry out a complete removal of the reacted material which tends to adhere to the inner surface of the outlet duct.

BRIEF DESCRIPTION OF THE INVENTION

According to a first embodiment of the invention a method has been provided for self-feeding and self-flushing a lubricant fluid material, in a high-pressure mixing apparatus for reactive chemical components, in which the apparatus comprises:

a mixing chamber;
an outlet duct for delivering a resulting mixture;
a reciprocable cleaning member axially sliding in the outlet duct; and
means for feeding the lubricant material by the reciprocating movement of the cleaning member into the outlet duct, the method comprising the steps of:
feeding the lubricant material from a storage tank into a lubricant supply chamber of the mixing apparatus, in fluid communication with the outlet duct;
conforming the cleaning member with a pumping piston slidably movable in the outlet duct;
sucking the lubricant material from the supply chamber into the outlet duct, and
reflowing the lubricant material from the outlet duct to the supply chamber and into the storage tanks, by the reciprocating movement of the pumping piston in the outlet duct.

According to a further feature of the invention, a high-pressure mixing apparatus has been provided for reactive chemicals components comprising:

a mixing chamber and means for feeding the chemical components into the mixing chamber;
an outlet duct for delivering a resulting chemical mixture from the mixing chamber;
a cleaning member axially sliding in the outlet duct;
means for feeding a lubricant fluid material, by the reciprocating movement of the cleaning member, into the outlet duct,
a lubricant supply chamber axially aligned and in fluid communication with the outlet duct;
pumping means operatively connected to the cleaning member, for sucking and flowing the lubricant material between the supply chamber and the outlet duct, said pumping means comprising a pumping piston reciprocable in the outlet duct; and
scraping means on the pumping piston for removing the chemical mixture adhered to an inner surface of the outlet duct.

According to a further characteristic of the invention, the pumping piston is provided at the fore end of the cleaning member and comprises at least one elastically yielding scraping member urged against the inner surface of the outlet duct, for scraping the reacted mixture adhered to said inner surface.

The high-pressure mixing apparatus can be of any type; for example, it can be of linear type in which a mixing chamber is axially aligned at the rear end of the outlet duct, or of the "L"-shaped type in which the mixing chamber is disposed at 90°, transversally arranged on a side of the outlet duct.

Lastly, it is pointed out that for the purposes of this invention the term "lubricant" is understood to mean any fluid capable of reducing the frictional forces between sliding surfaces, and to delay or prevent the reaction of the chemical components, as well as the adhesion of the reacted mixture to the inner surface of the outlet duct.

BRIEF DESCRIPTION OF THE DRAWINGS

Some embodiments of high-pressure mixing apparatuses provided with a device self lubricant device, according to the invention, and their working, will be described hereunder with reference to the drawings, in which:

FIG. 2 is a longitudinal cross-sectional view of a second mixing apparatus according to the invention;

FIG. 3 is cross-sectional view along the line 3-3 of FIG. 2;

DETAILED DESCRIPTION OF THE INVENTION

Figure 1:
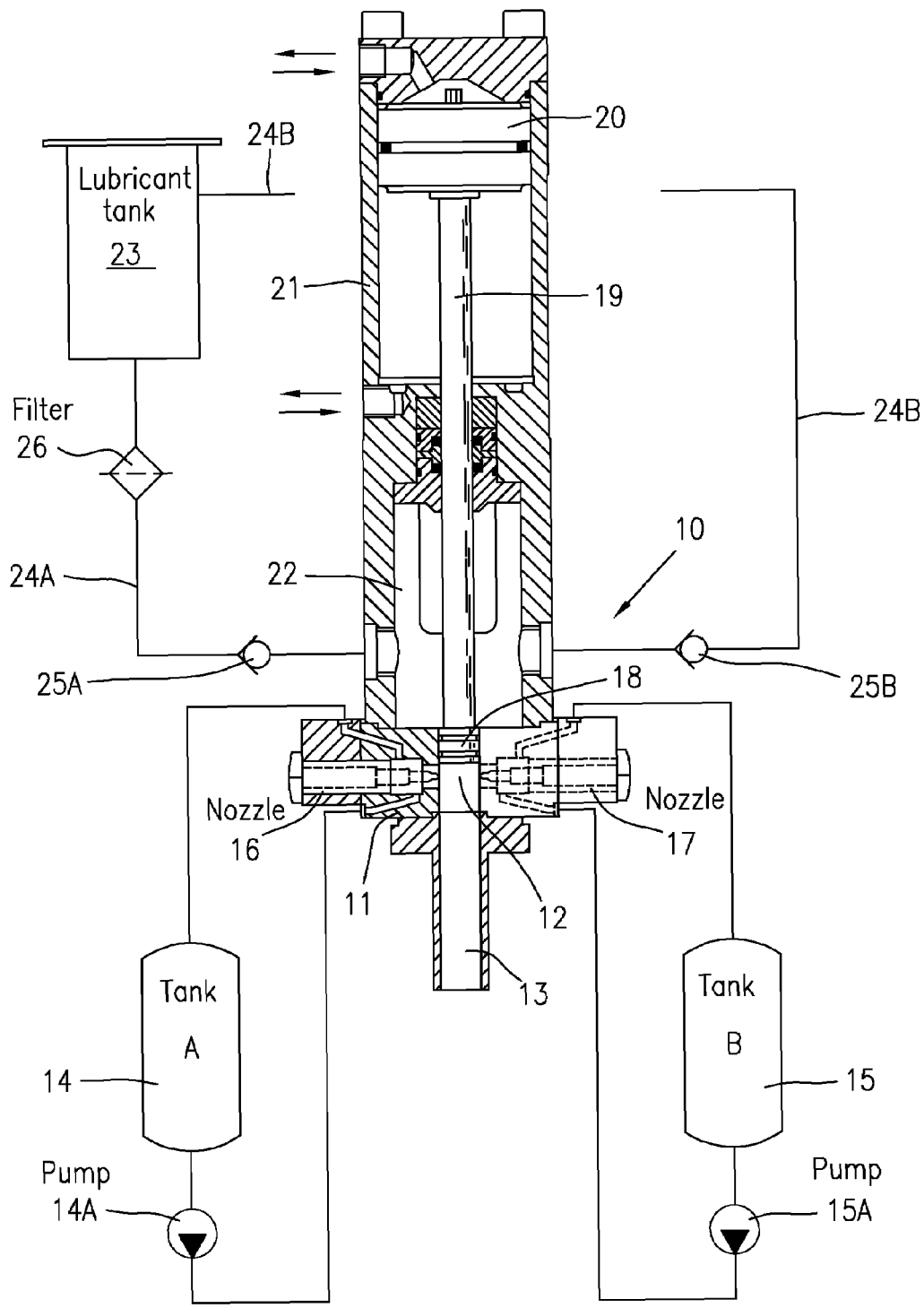
FIG. 1 is a longitudinal cross-sectional view of a first mixing apparatus according to the invention.

FIG. 1 shows a high-pressure self-cleaning mixing apparatus, of the linear type for mixing reactive chemical components into a resulting mixture, for example a polyol, an isocyanate and additives in the production of polyurethane foams and moulded articles.

In the example shown, the mixing apparatus, indicated as a whole by reference number 10, comprises a body 11 having a mixing chamber 12 axially aligned to an outlet duct 13 for delivering a mixture resulting from at least two reactive chemical components A and B contained in respective storage tanks 14 and 15.

A first injector 16 connected to the tank 14 by a metering pump 14A, and a second injector 17 connected to the tank 15 by a metering pump 15A inject the components A and B which impinge and thoroughly mix together in the mixing chamber 12, according to a widely used and per se known technology.

The mixing apparatus 10 comprises a cleaning device for the outlet duct 13 substantially provided by a reciprocable piston element 18 tightly sliding in the outlet duct 13. The piston element 18 is operatively connected to the piston 20 of a hydraulic actuator 21 by a piston rod 19 having a diameter smaller than the inner diameter of the mixing chamber 12 and the outlet duct 13, for the reasons explained further on.

According to the invention, the mixing apparatus 10 is provided with a lubricant self-feeding and flushing device capable of preventing a reaction between the chemical components of the resulting mixture adhering to the outlet duct, and to reduce the frictional forces between the piston element 18 and inside surface of the outlet duct 13; therefore the sticking caused by the film of reacted mixture normally adhering to the cleaning member and the inner surface of the duct 13 is avoided, allowing at the same time the removal of the scraped particles of the reacted mixture, from the same outlet duct.

The lubricant self-feeding device comprises a chamber 22 for containing and supplying an amount of lubricant, rearwardly positioned in respect to the body 11 of the mixing head; the lubricant chamber 22 is axially aligned and in direct fluid communication with the outlet duct 13, between the body 11 and the actuator 21.

The lubricant chamber 22, in turn, is connected to a lubricant storage tank 23 by a recirculation circuit, forming a closed loop; more precisely the re-circulation circuit comprises a first feeding duct 24A for sucking the lubricant from the storage tank 23 into the chamber 22, and a second duct 24B for recirculation of the lubricant from the chamber 22 to the storage tank 23, due to the pumping action of the piston element 18. Each of the ducts 24A and 24B is provided with a respective non-return valve 25A and 25B, while a filter 26 in the feeding duct 24A prevents any pollutants or scraped particles accumulated in the storage tank 23 from again being sucked into the lubricant chamber 22, thereby ensuring that filtered lubricant is constantly fed into the chamber 22, and into the outlet duct at each shot, as will be explained further on.

The lubricant feeding device also comprises pumping means provided by the piston 18 of the cleaning device, operatively connected to the actuator 21, for feeding lubricant into an annular space 38 (FIGS. 4 and 5) provided between the outlet duct 13 and the piston rod 19 in the advanced condition of the piston 18, and causing circulation of the same lubricant between the annular space 38 and the lubricant chamber 22, respectively between the chamber 22 and the storage tank 23 by the reciprocating movement of the piston element 18.

In this connection, in the example under consideration, the cleaning member is in the form of a piston element 18 having a diameter larger than the piston rod 19, and conformed to simultaneously perform several working functions, in particular: a first ejecting action of the residual mixture which remains in the duct 13 at the end of each shot or delivering step of the chemical mixture; a second pumping action for sucking and flushing the lubricant in the annular space 38 between the opposite surfaces of the piston rod 19 and the outlet duct 13. The piston element 18 is also conformed for performing a third working action for scraping the film of reacted mixture that tends to adhere to the inner surface of the outlet duct 13. The scraping action of the piston element 18, can be performed in combination with the pumping and circulation of the lubricant flow.

Figure 4:
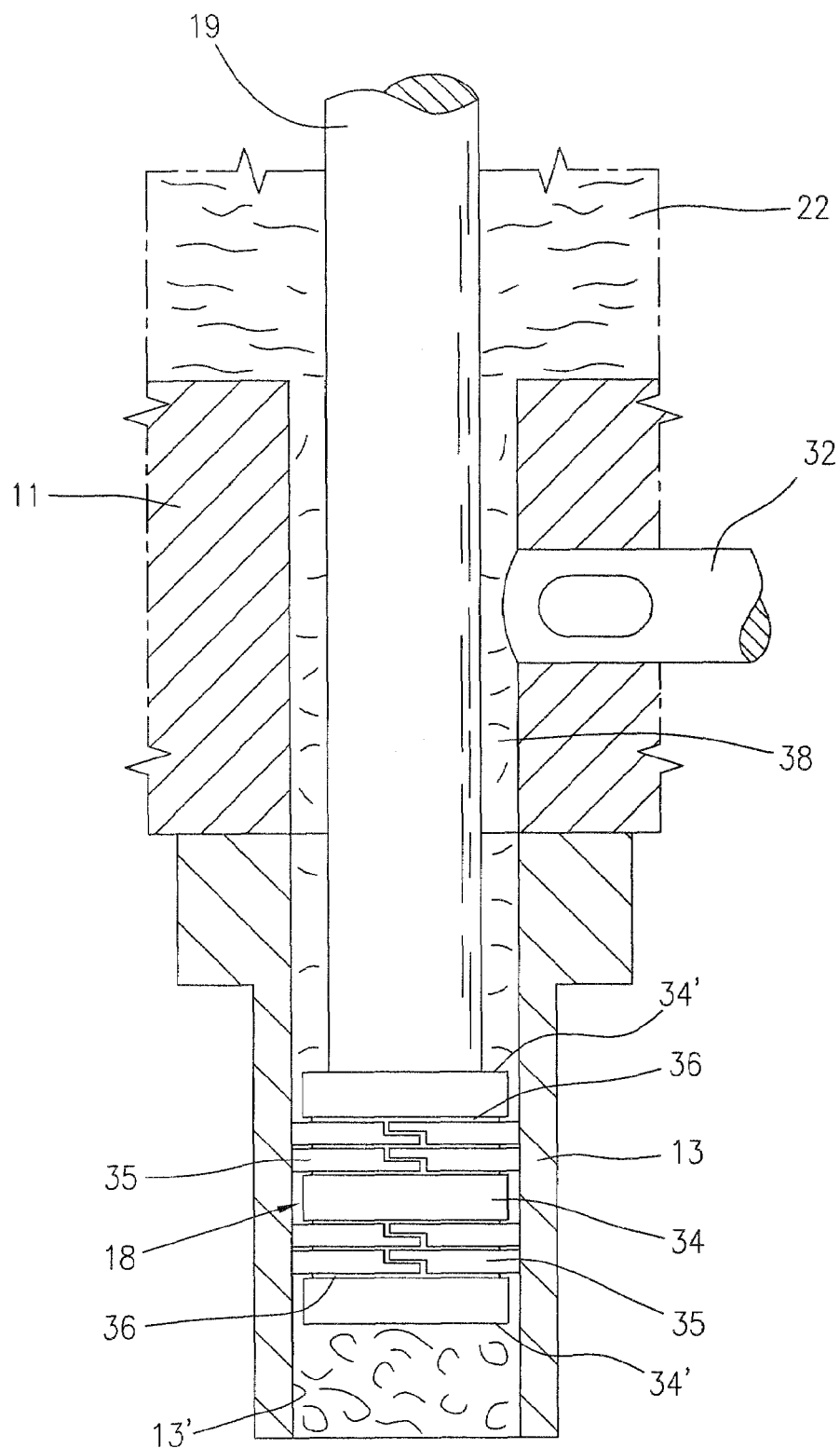
FIG. 4 is an enlarged detail of FIG. 2, showing a first embodiment of the cleaning and scraping member.
Figure 5:
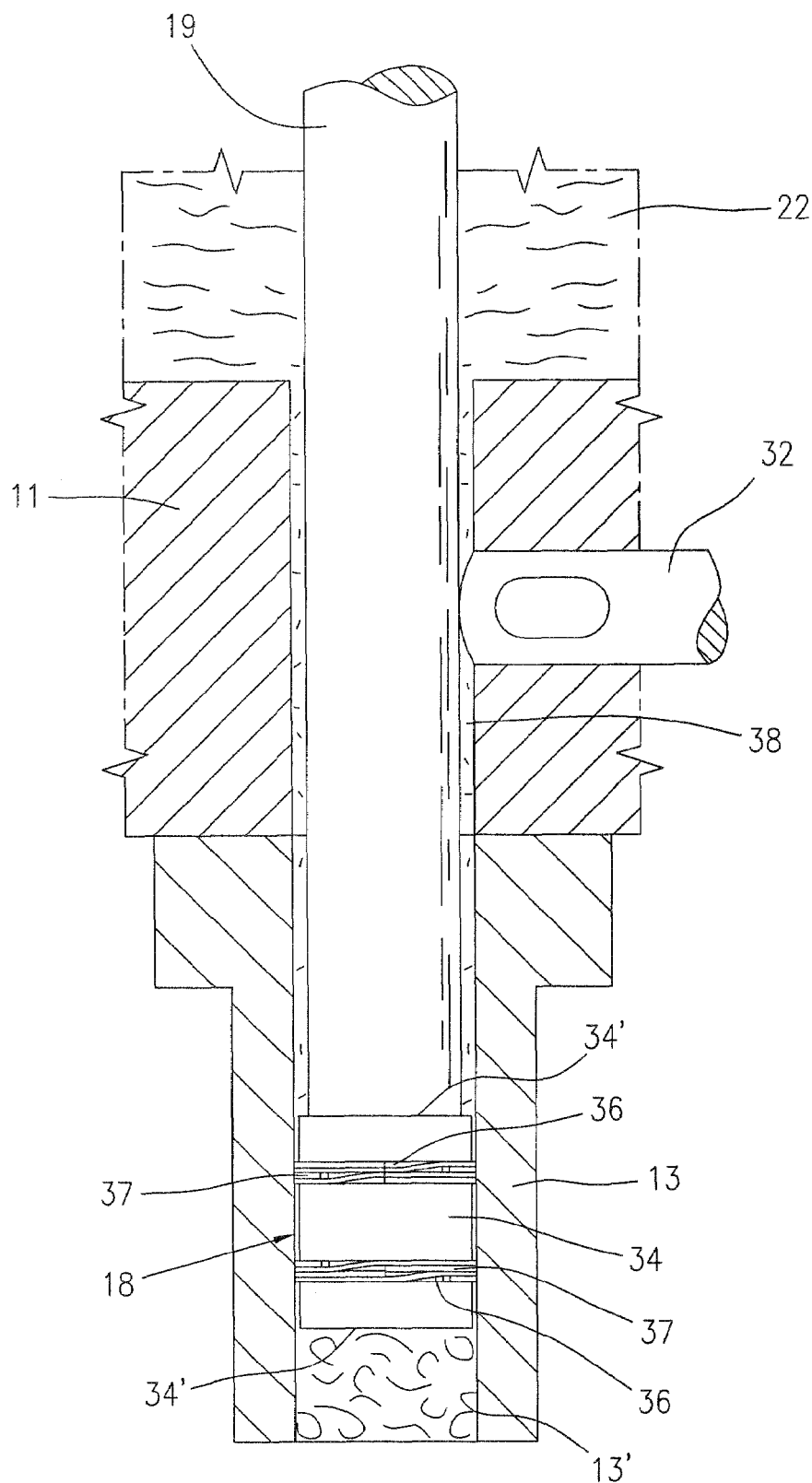
FIG. 5 is a detail similar to that of the previous figure, showing a second embodiment of the cleaning member.

The above will be more clearly explained hereunder with reference to the FIGS. 4 and 5 which show an enlarged detail of the mixing apparatus of FIGS. 2 and 3.

In particular, FIGS. 2 and 3 show a longitudinal cross-sectional view of a second type of mixing apparatus, for example of the type described in U.S. Pat. No. 961,853, provided with a self lubricating device according to the invention, as previously described for the example of FIG. 1; therefore, in FIGS. 2 and 3 the same reference numbers of FIG. 1 have been used for similar or equivalent parts.

The embodiment of FIGS. 2 and 3 differs from the solution of FIG. 1 due to the different disposition of the lubricant supply chamber 22, the mixing chamber 12 and the outlet duct 13.

In FIG. 1, the lubricant supply chamber 22 is axially aligned and in fluid communication with the outlet duct 13, through the mixing chamber 12; conversely in the embodiment of FIGS. 2 and 3, the mixing chamber 12 and the outlet duct 13 are arranged with a "L" disposition in which the mixing chamber 12 is transversally arranged on a side of the outlet duct 13, and in which the lubricant supply chamber 22 is again axially aligned and in direct communication with the outlet duct 13. A second cleaning member 32 is reciprocable in the mixing chamber 12 by a second hydraulic actuator 33 which is sequentially controlled in respect to actuator 21 for the pumping piston 18 and cleaning member of the outlet duct 13. For the remainder, and in particular as far as the device for cleaning the delivery duct 13, and for pumping or feeding and recirculating the lubricant is concerned, the apparatus of FIGS. 2 and 3 works in an identical way to the apparatus of FIG. 1.

The innovative aspects of the method and the mixing apparatus according to this invention will be explained in greater detail hereunder with reference to the FIGS. 4 and 5, in which the same reference numbers as FIGS. 2 and 3 have again been used for similar or equivalent parts.

FIG. 4 shows a first embodiment of a cleaning member, in the form of a piston 18 capable of performing besides the cleaning of the outlet duct 13, both the pumping of the lubricant, and a scraping action for removing the reacted mixture that has adhered to the inner surface of the outlet duct 13. As shown, the piston member 18 comprises a cylindrical body 34 extending between end cross surfaces 34', for a short length smaller than the axial length of the outlet duct 13; the piston member 18 is provided with annular sealing and scraping elements 35, elastically yielding and radially urged against the inner surface 13' of the outlet duct 13; sharp edges of the annular elements 35 exert an efficient scraping action against the internal surface 13' of the outlet duct 13, during reciprocating movement of the same piston member 18.

Each of the scraping elements 35, in the example of FIG. 4 is in the form of a split metal ring having an "L" or "Z" shaped-cross cut; one or more metal rings 35 may be seated in corresponding annular grooves 36 of the piston body 34; in place of, or in combination with the rings 35 of FIG. 4, it is possible to use the spirally shaped rings 37 of FIG. 5, providing in any case an external diameter of the rings 35 and 37 of a few tenths or hundredths of millimetre greater than the internal diameter of the outlet duct 13 up to 10 percent; therefore the sealing and scraping rings 35 and 37 may be elastically urged into contact with the internal surface 13' of said outlet duct 13.

FIGS. 4 and 5 illustrate the use of a cleaning member 18 in the form of a pumping and scraping piston of limited length, only slightly longer than the inner diameter of the outlet duct 13; however, the length of the cleaning and pumping piston 18, and the number of sealing and scraping rings 35 and 37 can also differ from what has been shown; for example, the length of the body 34 of the cleaning piston member 18 can range from 0.5 to 5 times the internal diameter of the outlet duct 13, and the scraping members can be of any number, for example ranging from 1 to 10.

With reference to FIGS. 1 or 2 and 4, a description will now be given of the working of the cleaning, self-feeding and lubricant flushing device according to this invention.

During the pouring or the injection into a mould of the chemical mixture, the cleaning member 18 is in the totally backward or retracted position of FIG. 2, to close the fluid communication between the lubricant supply chamber 22 and the mixing chamber 12 in FIG. 1, or the outlet duct 13 in FIG. 2; simultaneously, the cleaning member 32 for the mixing chamber 12 of the embodiment of FIGS. 2 and 3 is also in the backward position in which it opens the injectors 16 and 17 towards the mixing chamber 12. In this condition, the chemical components A and B, fed by respective metering pumps 14A and 15A, are injected into and thoroughly mixed into the chamber 12, from which the resulting mixture is discharged through the outlet duct 13.

During mixing and delivering step of the mixture, the cleaning member 18 remains in the fully backward position with the piston rod 29 of the control piston 20 partially immersed in the lubricant contained in the supply chamber 22.

Upon completion of the pouring or injection step of the mixture into a mould, the feeding of the components A and B is interrupted and recirculated to respective tanks 14 and 15; then the cleaning member 18 is made to move forward to eject the residual mixture that remains in the outlet duct 13; this condition is shown in the detail of FIGS. 4 and 5.

During its forward movement, the cleaning member 18, in addition to ejecting the residual mixture, scrapes the film of mixture that remains adhering to the internal surface 13' of the outlet duct 13.

In addition to the two above-mentioned functions, the cleaning member 18, as previously mentioned, performs a pumping action for flushing the lubricant. In particular, during the forward movement of the cleaning member 18 from the backward position of FIG. 2 to the forward position of FIG. 4 or 5, an annular space 38 is provided between the opposite surfaces of the piston rod 19 and of the outlet duct 13; in this way the lubricant is sucked from the supply chamber 22 into the annular space 38, totally wetting the inner surface of the delivery duct 13, which at the same time the cleaning member 18 has scraped, ejecting the reactive chemical mixture.

At the same time the lubricant is sucked from the supply chamber 22 into the annular space 18 of the outlet duct 13 by the pumping action of the cleaning member 18, fresh filtered lubricant is sucked from the storage tank 23, along the feeding duct 24A, into the lubricant chamber 22; suction of lubricant from recycling duct 24B is prevented by the ball valve 25B.

Before starting of a subsequent mixing step, the cleaning member 18 is again moved back to the retracted position of FIG. 2; during its backward movement, the cleaning piston member 18 again performs a pumping and scraping action, in the opposite direction to the previous one, flushing the lubricant and scraped particles of the reacted mixture from the annular space 38 of the outlet duct 13 into the supply chamber 22, simultaneously causing the re-circulation of the lubricant from the chamber 22 to the storage tank 23, along the duct 24B; in this way, it is possible to carry out an efficient flushing action and a periodical change of lubricant in the supply chamber 22 of the mixing apparatus, preventing the scraped particles of reacted material to accumulate in the lubricant and depositing into the chamber 22.

FIGS. 1, 2, 4 and 5 show several examples of cleaning and lubricant pumping devices, according to the invention, applied to two different types of high-pressure mixing apparatuses; it is obvious however that what has been described and shown with reference to the aforesaid figures, has been given purely by way of example in order to illustrate the present invention and some possible solutions.

It is understood therefore that other modifications or changes may be made to the entire apparatus and/or to the cleaning and lubricant pumping device, without thereby departing from the accompanying claims.

What is claimed is:

1. A method for self-feeding and self-flushing a lubricant fluid material, in a high-pressure mixing apparatus for reactive chemical components, in which the apparatus comprises:
   a mixing chamber;
   an outlet duct for delivering a resulting mixture;
   a reciprocable cleaning member axially sliding in the outlet duct; and
   means for feeding the lubricant material by the reciprocating movement of the cleaning member into the outlet duct, the method comprising the steps of:
   feeding the lubricant material from a storage tank into a lubricant supply chamber of the mixing apparatus in fluid communication with the outlet duct;
   conforming the cleaning member with a pumping piston slidably movable in the outlet duct;
   sucking the lubricant material from the supply chamber into the outlet duct; and
   reflowing the lubricant material from the outlet duct to the supply chamber and into the storage tank, by the reciprocating movement of the pumping piston in the outlet duct.

2. The method according to claim 1, comprising the step of performing a lubricant pumping and flushing action and a scraping action of the reacted mixture by the reciprocating movement of the pumping piston into the outlet duct.

3. The method according to claim 1, comprising the step of filtering the lubricant material sucked from the storage tank.

4. A high-pressure mixing apparatus for reactive chemical components, comprising:
   a mixing chamber and means for feeding the chemical components into the mixing chamber;
   an outlet duct for delivering a resulting chemical mixture from the mixing chamber;
   a cleaning member axially sliding in the outlet duct;
   means for feeding a lubricant fluid material, by the reciprocating movement of the cleaning member into the outlet duct,
   a lubricant supply chamber axially aligned and in fluid communication with the outlet duct;
   pumping means operatively connected to the cleaning member for sucking and flowing the lubricant material between the supply chamber and the outlet duct, said pumping means comprising a pumping piston reciprocable in the outlet duct; and scraping means on the pumping piston for removing the chemical mixture adhered to an inner surface of the outlet duct.

5. The apparatus according to claim 4, wherein a lubricant storage tank and conduit means for circulation of lubricant material are both provided between the supply chamber and the storage tank.

6. The apparatus according to claim 5, wherein the conduit means for circulation of lubricant material comprises a feeding duct between the storage tank and the supply chamber; a recirculation duct between the supply chahmber and said storage tank; and a check valve in said feeding and recirculation ducts.

7. The apparatus according to claim 6, wherein a filter is provided between the storage tank and the check valve.

8. The apparatus according to claim 4, wherein the pumping piston is operatively connected to an actuator by a piston rod having a diameter smaller than an internal diameter of the outlet duct and in that, in the forward position of the pumping piston, an annular space is provided between opposite surfaces of the piston rod and the outlet duct.

9. The apparatus according to claim 4, wherein the pumping piston comprises scraping means elastically urged against an inner surface of the outlet duct.

10. The apparatus according to claim 9, wherein said scraping means comprises at least one annular element tightly urged against the inner surface of the outlet duct.

11. The apparatus according to claim 10, wherein the annular scraping element is in the form of a split ring.

12. The apparatus according to claim 10, wherein the annular element is in the form of a spiral ring.

13. The apparatus according to claim 4, wherein the pumping piston is axially extending for a length ranging from 0.5 to 5 times an inner diameter of the outlet duct.

14. The apparatus according to claim 4, wherein the mixing chamber is axially arranged to the outlet duct.

15. The apparatus according to claim 4, wherein the mixing chamber is transversally arranged, on one side of the outlet duct.

* * * * *